(12) United States Patent
Schwerdtner

(10) Patent No.: US 8,259,165 B2
(45) Date of Patent: Sep. 4, 2012

(54) IMAGE DISPLAY DEVICE FOR AN AUTOSTEREOSCOPIC DISPLAY WITH A SWEET SPOT UNIT CONTAINING AN IMAGE MATRIX AND A CORRECTIVE MATRIX FOR CORRECTING FIELD CURVATURE

(75) Inventor: Armin Schwerdtner, Dresden (DE)

(73) Assignee: Seereal Technologies GmbH, Dresden (DE)

( * ) Notice: Subject to any disclaimer, the term of this patent is extended or adjusted under 35 U.S.C. 154(b) by 1439 days.

(21) Appl. No.: 11/814,528

(22) PCT Filed: Jan. 19, 2006

(86) PCT No.: PCT/DE2006/000116
§ 371 (c)(1), (2), (4) Date: Jul. 23, 2007

(87) PCT Pub. No.: WO2006/076913
PCT Pub. Date: Jul. 27, 2006

(65) Prior Publication Data
US 2009/0315983 A1  Dec. 24, 2009

(30) Foreign Application Priority Data
Jan. 24, 2005 (DE) .......................... 10 2005 004 303

(51) Int. Cl.
*H04N 13/02* (2006.01)
(52) U.S. Cl. ........................................ 348/59
(58) Field of Classification Search .............. 348/42, 348/51, 53, 554, 58, 59; 353/7, 8
See application file for complete search history.

(56) References Cited

U.S. PATENT DOCUMENTS

| | | | |
|---|---|---|---|
| 5,410,345 A | 4/1995 | Eichenlaub | |
| 5,579,164 A | 11/1996 | Chapnik | |
| 6,014,164 A | 1/2000 | Woodgate et al. | |
| 6,137,456 A | 10/2000 | Bhagavatula et al. | |
| 6,339,506 B1 | 1/2002 | Wakelin et al. | |
| 6,721,101 B2 | 4/2004 | Daniell | |
| 7,425,069 B2 * | 9/2008 | Schwerdtner et al. | 353/7 |
| 2001/0005284 A1 | 6/2001 | Lee et al. | |
| 2002/0001133 A1 | 1/2002 | Magee | |

FOREIGN PATENT DOCUMENTS

| | | |
|---|---|---|
| DE | 10339076 A1 | 3/2005 |
| EP | 0570179 A2 | 10/1993 |

(Continued)

*Primary Examiner* — Robert B Harrell
(74) *Attorney, Agent, or Firm* — Saul Ewing LLP

(57) ABSTRACT

The invention relates to an image display device comprising an imaging matrix, which consists of imaging elements which are arranged in a lateral manner, for example, lenticulars or a lens array, and a plurality of point elements which are disposed on a object plane and which are formed from the imaging elements in an observation chamber. In order to reduce imaging errors resulting in the image field curvature of the individual imaging elements of a large observation angle, compensation by a correction matrix, which contains a plurality of optical corrections elements, takes place. An optical correction element is associated with each individual optical imaging element. Said invention can be used, for example, in image or video display devices, such as autostereoscopic displays, multi-user-displays with sweet-spot-units and multi-view-displays, in order to image illuminating elements. The invention also relates to displays comprising a sweet-spot-unit, which can be switched for one or more observers into a two-dimensional mode and also in an autostereoscopic mode.

9 Claims, 2 Drawing Sheets

FOREIGN PATENT DOCUMENTS

| | | |
|---|---|---|
| EP | 0881844 A2 | 12/1998 |
| JP | 57-087291 | 5/1982 |
| WO | 9959020 | 11/1999 |
| WO | 0205014 A1 | 1/2002 |
| WO | 0248755 A2 | 6/2002 |
| WO | 03019952 A1 | 3/2003 |
| WO | 03053072 A1 | 6/2003 |
| WO | 03090479 A1 | 10/2003 |
| WO | 2005027534 A2 | 3/2005 |

* cited by examiner

IMAGE DISPLAY DEVICE FOR AN AUTOSTEREOSCOPIC DISPLAY WITH A SWEET SPOT UNIT CONTAINING AN IMAGE MATRIX AND A CORRECTIVE MATRIX FOR CORRECTING FIELD CURVATURE

CROSS REFERENCE TO RELATED APPLICATIONS

This application claims the priority of PCT/DE2006/000116 filed on Jan. 19, 2005 and DE 10 2005 004 303.8 filed on Jan. 24, 2005, the entire contents of which are hereby incorporated in total by reference.

FIELD OF THE INVENTION

The invention relates to an image display device comprising an imaging matrix which consists of laterally arranged imaging elements, such as lenticulars or lens arrays. More specifically, the imaging elements may be spherical or aspherical lens elements, holographic optical elements (HOE) or optical imaging elements of any other type which are combined with or among each other, arranged in the direction of light propagation in stacks.

DESCRIPTION OF RELATED ART

This invention may, for example, be applied to image illumination elements in image or video display devices such as autostereoscopic displays, multi-user displays with sweet spot unit and multi-view displays. Further, this invention can advantageously be used in large-area display devices, such as advertising boards, and generally to image image elements. By applying this invention the use of heavy and voluminous lenses are avoided. Both illumination elements and image elements will be referred to as point elements in this document.

This invention is of major importance in conjunction with displays comprising a sweet spot unit, the displays being able to be switched between a two-dimensional and an autostereoscopic three-dimensional mode for one or several users.

A sweet spot unit, particularly in an autostereoscopic multi-user display, is a device for directed illumination, for example, of a transmissive image matrix used for image modulation. The unmodulated light of the sweet spot unit must permeate large areas of this transmissive image matrix as homogeneously as possible.

The sweet spot unit contains a large-area imaging matrix with imaging elements in order to image the light of activated illumination elements of an illumination matrix in the form of one or several simultaneously generated sweet spots on to the eyes of at least one viewer inside a space by approximately parallel bundles of rays. A multitude of illumination elements are assigned to each imaging element of the sweet spot unit. A position detector activates only one or only few illumination elements for each sweet spot at a time, depending on the number and position of the eyes of the viewer(s). It has been found that the extension of a sweet spot and the light homogeneity of it as well strongly depend on the position of the activated illumination element(s) relative to the imaging element. Illumination elements situated towards the edge of a imaging element generate sweet spots with a different cross-section and different light distribution than illumination elements situated towards the centre of a imaging element. This is because the illumination elements are disposed at different distances from the rear focal point of the imaging element, this causing the bundles of rays to propagate deviating from parallel.

This in turn leads to inhomogeneities within a sweet spot and cross-talk among sweet spots. Controllable viewing angles, which can be realised with known sweet spot units, are therefore limited, in particular in a multi-user mode. With autostereoscopic displays that are based on the tracking or multi-view methods, the extent of cross-talk strongly depends on the position of a viewer in front of the display.

The image quality in the aforementioned image display devices may be deteriorated considerably by optical imaging errors of individual imaging elements of the imaging matrices. In addition to spherical aberration, coma, distortion and Moiré effect, which is characteristic for combinations of periodic structures, e.g. of illumination and imaging matrix, particularly field curvature for large angles of light incidence is an adverse effect.

Therefore, the object of the present invention is to reduce field curvature effects when imaging point elements arranged as a matrix in an object plane using an imaging matrix.

Now, the influence of field curvature will be illustrated with the help of autostereoscopic displays. The image quality of these displays is mainly characterised by the extent of cross-talk between the two eyes.

In contrast to simple 2D images, pseudoscopic images are generated which cause the viewer to perceive a depth inversion. This is observed with both multi-view and sweet spot-based displays and is caused by bundles of rays incident on the imaging elements at oblique angles, whereby the angles of the bundles of rays with respect to the optical axis should be as large as possible so to generate large viewing zones. Displays with a sweet spot unit use a controllable illumination matrix, such as an OLED matrix. The illumination matrix is disposed approximately in the rear focal plane of the imaging matrix, which may be a lenticular. Each lenticule of the lenticular emits collimated paraxial rays. As the angles of incidence of the light rays increase, the rear focus moves away from the plane illumination matrix towards the lenticules (see also FIGS. 1 and 2). The light leaving the image side of the lenticular is no longer collimated, but is focused respectively as the angles of incidence increase. For these bundles of rays, the extension of the sweet spot at the viewer level is reduced whereby the bundles of rays are focussed in front of the viewer already, then diverging again. This causes cross-talk if the angles are sufficiently large.

The field curvature is a long time known optical imaging error also with parallel optical systems, i.e. imaging matrices, which occurs in the region of the individual imaging elements, adversely affecting the imaging behaviour of the respective optical device. As can be seen in the prior art documents mentioned below, various measures and solutions have been proposed in order to reduce or to suppress the adverse effects caused by field curvature, e.g. by adding additional optical elements in the optical path, or by arranging the imaging elements on a curved surface which follows the field curvature.

Document WO 03/090479 describes a correction of the field curvature for a stereoscopic display with a lenticular, where several LEDs per lenticule are arranged on curved surfaces as the elements of an illumination matrix. However, such a three-dimensional illumination matrix with complicated shape can only be realised with great efforts. Moreover, this solution has the disadvantage that the shape of the illumination matrix must always be adapted to the imaging matrix used. This means that the illumination matrix must be changed whenever a different imaging matrix is used.

A two- or three-part lens array for stereoscopic systems is described in U.S. Pat. No. 6,721,101 B2. The arrays can be designed as regular formed micro-lens arrays or as lenticulars, their forms being adapted such that the field curvature and consequential cross-talk effects are corrected. However, their application in the optical devices described above, i.e. with large viewing angles, is problematic. Due to the spatial arrangement of individual lens elements there are gaps which may lead to vignetting. This gaps cause an inhomogeneous illumination of the image matrix if light is incident decentrally at large angles. But, in particular, multi-user displays require large viewing angles. Thus, generally, the applicability of such lens arrays in autostereoscopic displays is limited. Moreover, the manufacturing technology is rather expensive due to the multisectional arrangement of the lenticules or lenses.

Document U.S. Pat. No. 6,339,506 B1 describes correction of field curvature and astigmatism in applications containing optical mini-lenses. For correcting the mini-lenses, that invention employs an array of micro-lenses each which is subdivided into sub-arrays with lenses that vary as regards their optical properties, e.g. focal length. The focal lengths of the micro-lenses vary according to their distance from the centre towards the edges. That is, the focal lengths near the centres are smallest and increase towards the edges. The field curvature is corrected in an object plane with point shaped light sources arranged in a matrix. The disadvantages of this solution are that despite expensive manufacture of the micro-lens arrays only small angular variations are possible, and that the brightness is reduced.

Also, the arrangement and assignment of the individual lenses and of the lens arrays requires greatest precision in order to be able to achieve the desired correction.

EP 1 005 666 A1 describes how an image generated on a curved CRT face is viewed as a 3D representation on the planar face of an autostereoscopic display, or is processed. Transferring the image from the CRT to the display virtually means to image the image of a curved surface on to a plane for further use. For that, regular micro-lens arrays disposed on three two-dimensionally curved faces are positioned between the CRT and display. All micro-lenses are of equal size. Only the distances between the micro-lenses of the individual arrays vary due to the curvature of the respective array. With this arrangement, the curvature of the entire image field is flattened by means of three differently curved lens arrays, but not the image field curvature of the individual micro-lenses. Drawbacks of this arrangement are the enormous efforts required for precise manufacture of the many micro-lenses and their accurate positioning on the three two-dimensionally curved faces, and the voluminous design of the entire device.

A viewing device for creating three-dimensional perception of images with a lenticular in front of a flat screen is disclosed in EP 0 404 289. This is an autostereoscopic multi-view display with spatial interleaving of images and with image separation means. Thickness of the lenticular increases and the pitch of the individual cylindrical lenses decreases in horizontal direction, symmetrically from the centre of the lenticular towards both edges. This measure also corrects the entire image field, but not the optical effect, which is determined by optical errors, of the individual cylindrical lenses of the lenticular. This solution is thus unsuitable in conjunction with the present application.

SUMMARY OF THE INVENTION

Object of the present invention is to reduce optical errors in optical devices of the above-mentioned types caused by field curvature of the individual imaging elements, which occur due to large viewing angles, with image display devices which include an imaging matrix of optical imaging elements.

Correction shall only make minimal use of optical means, maintain a design as flat as possible of the image viewing device, and shall be adapted optimally to the imaging matrix production technology.

This invention is based on the finding that in an image display device with a sweet spot unit the known field curvature leads to cross-talk among partial images to a considerable extent, and to inhomogeneities of the image representation.

This invention is based on an image display device which includes an imaging matrix with optical imaging elements and a multitude of point elements in an object plane, whereby said point elements are imaged into a viewing space by the imaging elements.

According to this invention, the problem is solved by compensating the adverse effects caused by field curvature of the imaging matrix through a corrective matrix which comprises a multitude of optical correction elements. One optical correction element is assigned to each of the optical imaging elements.

The corrective matrix has a structure which is determined by its assignment to the imaging elements (or their pitch), and by the shape of the correction elements determined by the field curvature of the corresponding imaging elements.

An advantage of the invention is that only shape and pitch of the imaging and correction elements are matched, independent of the structure of the illumination matrix and image matrix. This provides the possibility to use various image matrix and illumination matrix structures without any adaptation when making a display device for an existing imaging matrix structure.

To correct the field curvature, a single corrective matrix is preferably disposed in the optical path of the imaging matrix.

In order to avoid the occurrence of disturbing reflections due to jumps in the refractive index in the imaging of the point elements, the refractive index of the corrective matrix is matched with that of the neighbouring medium, according to the position of the corrective matrix in the optical path.

In a preferred embodiment of the invention as an autostereoscopic multi-user display with a directed backlight, the point elements, which are arranged in a matrix, are controllable illumination elements of an illumination matrix, which are imaged on to the eyes of at least one viewer through a imaging matrix.

The illumination matrix may contain active illumination elements, such as LEDs or OLEDs, as well as passive illumination elements, such as pixels or sub-pixels of an illuminated LC-display. The controllable illumination elements can be, e.g., any defined number of openings of a shutter, each of said openings being assigned to one element of an imaging matrix and of a corrective matrix. This means that each imaging element and correction element, respectively, images an assigned number of pixels of the illumination matrix into the viewing space.

If the imaging matrix, e.g., is a lenticular of parallel arranged convex lenticules, the corrective matrix is a lenticular of parallel concave lenticules. The corrective matrix is preferably disposed near the illumination matrix or even connected to it with its planar face.

In another embodiment of the corrective matrix in the display, said corrective matrix is disposed in the immediate vicinity of the imaging matrix. It is then formed as a lenticular of convex correction elements which are arranged in parallel, the plane face of said lenticular being connected to the lenticular that functions as the imaging matrix. These two embodiments of the corrective matrix allow advantageously maintaining the very flat design of the autostereoscopic display. The manufacturing process of the corrective matrix must be adapted optimally to the manufacturing process of the imaging matrix, in order to manufacture the two matrices as inexpensively as possible. Thus, same optimum manufacturing conditions can be created for the two matrices and possible sources of errors can be avoided.

In a preferred embodiment of an image display device with an illumination matrix, the corrective matrix has variable optical parameters. This allows combined imaging and corrective matrices to be realised with the help of multi-part liquid lenses.

In a preferred embodiment of an image display device with an illumination matrix, the corrective matrix has variable optical parameters. This allows combined projection and corrective matrices to be realised with the help of multi-part liquid lenses.

In a further embodiment of this invention, the point elements in an object plane can be the image elements of a multi-view display, and the image matrix can contain at least two views of an image or video.

Here, the corrective matrix is advantageously disposed between the imaging matrix and image matrix.

The manufacturing process for the corrective matrix can be facilitated technologically by structuring the surface of the illumination matrix or image matrix used. The shape of this structure is thereby defined by the shape of the field curvature of the imaging matrix to be corrected.

This invention provides autostereoscopic displays with larger viewing zones, more homogeneous illumination of the stereoscopic images or image sequences, and with improved imaging quality in all.

DETAILED DESCRIPTION OF THE INVENTION

Now, the effect of the corrective matrix according to this invention during imaging of point elements with an imaging matrix will be described in greater detail.

The imaging matrix consists for example of imaging elements in the form of stripes or lenses. The illumination matrix consists of a multitude of illumination elements.

Figure 1:
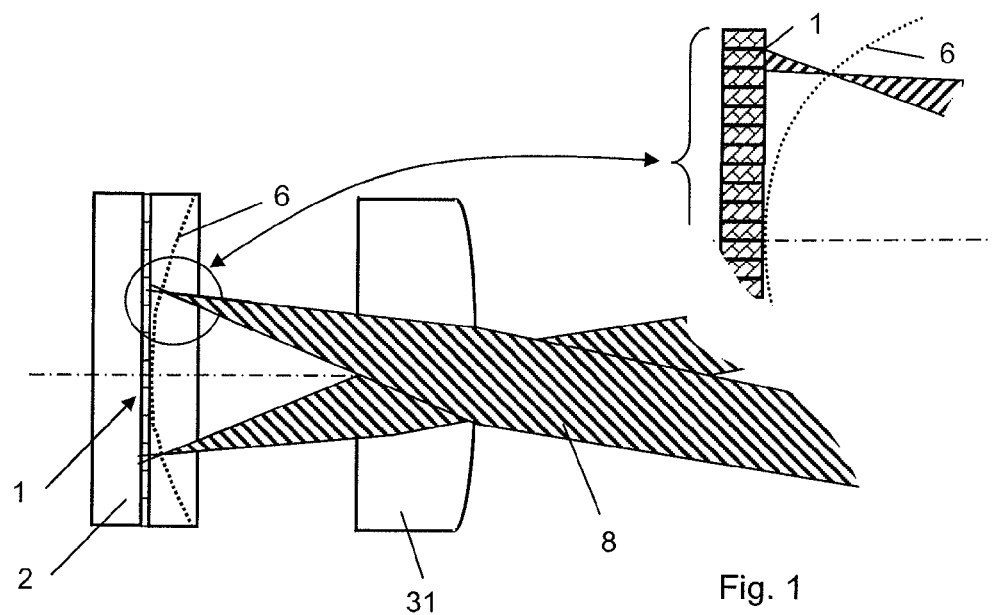
FIG. 1, the bundles of rays of two illumination elements during imaging through a lenticule of a lenticular, the field curvature, and a detailed view of the optical path to illustrate the effects of the field curvature on one of the bundles of rays.

FIG. 1 illustrates, in simplified form, the effect the field curvature has in an autostereoscopic multi-user display. The field curvature represents the actual course of the rear focal points of inclined rays, which arises during the imaging of illumination elements through an imaging element of an imaging matrix. The illumination matrix (only partly shown in the figure), for example a shutter 2, contains a number of pixels 1 as illumination elements. An imaging matrix in the form of a lenticular with parallel, stripe shaped lenticules 31 as imaging elements for focusing light on to viewer's eyes, seen in the direction of light propagation, is disposed behind the illumination matrix, only one lenticule 31 being shown in the figure. The field curvature 6 is represented by a dotted line, and a narrow imaged bundle of rays is seen each for two pixels which are situated at the same distance to the optical axis of the lenticule, but in opposite directions. The detail in FIG. 1 shows that the focal point of a bundle of parallel rays 8 is situated on a curve in front of the shutter plane due to the effects of field curvature 6. This applies to all bundles of rays to be imaged. As the angles of incidence of the light rays increase, the rear focus moves away from the illumination matrix and towards the lenticules 31. This means that due to the dislocation of the focal points the pixels 1 in the shutter plane are not imaged through bundles of parallel rays 8, as intended. Because the pixels 1 to be imaged are now situated within a range of twice the focal length, the light no longer leaves the image side of the lenticular in the form of collimated rays, but is focussed towards the lenticular, depending on the increasing angle of incidence. In contrast, the paraxial rays leave the lenticule as collimated rays. The sweet spot extension is defined by the pixel size and distance of the viewer. For the bundles of rays 8 in FIG. 1, the extension of the sweet spot is reduced at the viewer's level, until the bundles of rays are focussed well in front of the viewer and then diverge again even to run to the other eye of the viewer as soon as the angle is large enough. This results in cross-talk. The more distant a viewer is from a central position, the more striking are the effects of this optical error. Due to the erroneous imaging of illumination elements, blurring and other adverse effects occur towards the edges of the viewing windows.

These drawbacks are not only observed with multi-user displays, but also with multi-view displays, and with large-area display devices if large viewing angles or multiple views are to be realised.

The detail in FIG. 1 shows the offset of pixel 1 to the curved focal plane, whereby the rays converge once they have passed the lenticule, but then finally diverge in the viewing plane. Because of the given position of the viewer, all rays of the lenticules 31 take on this angle, which leads to the divergences just described. For all lenticules and thus for the entire sweet spot unit this leads to inhomogeneous illumination of the transmissive image matrix and to cross-talk. The viewer perceives the image or video with the above-described disturbances. These have particularly negative effects with a display for multiple viewers, because the viewers are located at different positions in front of the image matrix. Their positions are determined by a position detector, which causes a sweet spot unit to deliver a bundle of rays to each eye of a viewer in the form of an extended sweet spot. The sweet spot unit comprises an illumination matrix and an imaging matrix arranged behind the former, seen in the direction of light propagation. The sweet spot is defined as a region of stereoscopic viewing without cross-talk, and the bundle of rays generating the sweet spot homogeneously permeates an image matrix arranged behind the sweet spot unit with light, is alternately modulated with right and left image information in the image matrix, thus permitting selectively viewing in a 2D or 3D mode. Thanks to the extended sweet spot, viewers enjoy a certain range for motion around their position without losing the stereo impression. Depending on the position of the viewer, illumination elements of the illumination matrix, i.e. pixels 1, are activated according to the path of the bundles of rays. Any number of pixels can be predetermined in association with one imaging element. If a viewer moves the sweet spots will be tracked by activating other pixels. The further away from the axis a pixel is situated, the larger is the divergence of rays caused by field curvature, and the illumination of the sweet spots is reduced due to the field curvature. In addition to a deteriorated imaging quality, the illumination of the image matrix is also perceived to be inhomogeneous due to the interaction of divergent light portions.

Figure 2:
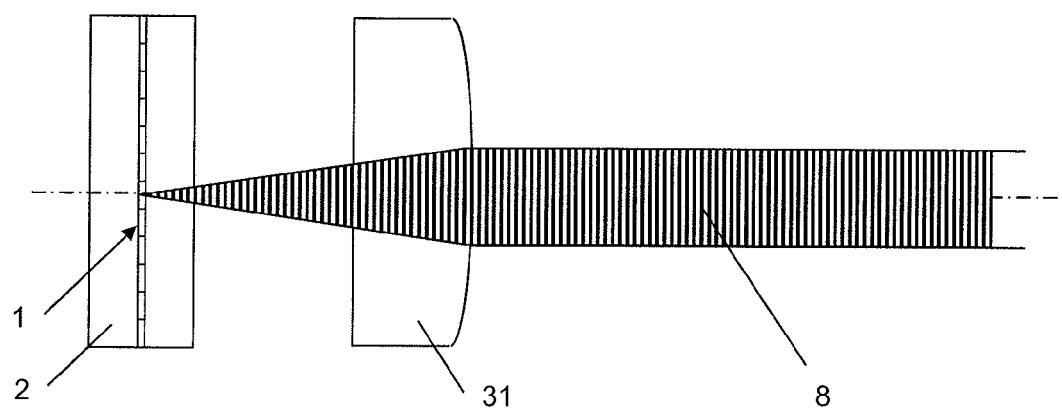
FIG. 2, the focusing of a pixel through a lenticule of a lenticular with the help of paraxial rays.

FIG. 2 shows the imaging of a pixel 1 along the optical axis of lenticule 31, the pixel being imaged on to the sweet spot through a bundle of paraxial rays. The imaging matrix consists of a lenticular with a multitude of parallel lenticules arranged in vertical direction, only one lenticule 31 being shown in the figure. Any number of pixels 1 of the shutter 2 are assigned to one lenticule 31 and located in front of that lenticule. The pixel 1 to be imaged is located about in the focal point of the lenticule 31, and is directed in the form of a bundle of parallel rays 8 to a right/left eye of a viewer in a viewing space (not shown).

Figure 3:
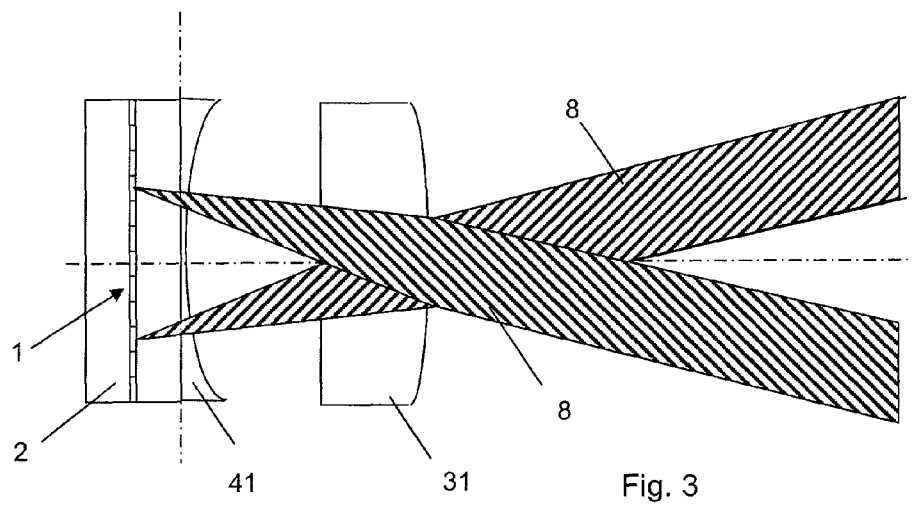
FIG. 3, an embodiment of a correction element, which is directly attached to the glass surface of an illumination matrix (not fully shown)

FIG. 3 shows one embodiment of this invention which solves the above-mentioned problem. A corrective matrix with correction elements correcting field curvature 6 (FIG. 1) is disposed near the object plane and thus on the surface of a shutter 2. A lenticular 4 with concave spherical lenticules 41 is used as a corrective matrix in this embodiment, only one such lenticule is shown in the figure. The surface of the lenticules 41 of the lenticular 4 exhibits a curvature which is predetermined by the field curvature 6, thus compensating the field curvature of the imaging matrix.

The lenticulars are further arranged such that each lenticule 31 is located opposite exactly one correction lenticule 41, whereby both lenticules 31, 41 have about the same pitch, taking into account the shortening through the perspective.

One advantage of this invention is that, in an autostereoscopic multi-user display with directed backlight, almost identical bundles of parallel rays 8 are achieved for each controllable pixel 1 of the shutter 2, irrespectively of the position of the pixel with respect to the imaging element.

A correction of the field curvature according to this invention can also be achieved by structuring the surface of the illumination matrix such that it flattens laterally the known run of the field curvature, thus compensating the optical error of the imaging matrix.

The corrective matrix can be arranged at any position between the illumination matrix and imaging matrix. Its structure depends on the necessary correction of the field curvature at its actual position.

For suppressing reflections, which also lead to inhomogeneous illumination of the sweet spots and the image matrix, it is useful to adapt the refractive index of the corrective matrix to that of the ambient medium. This requirement is fulfilled, for example, by plastic materials used for lens making. Undesired reflections at interfaces in the optical path are thus avoided. The surface of the illumination matrix and the plane face of the corrective matrix are preferably joined without any change of the refractive index, such as by gluing.

Figures 4A, 4B:
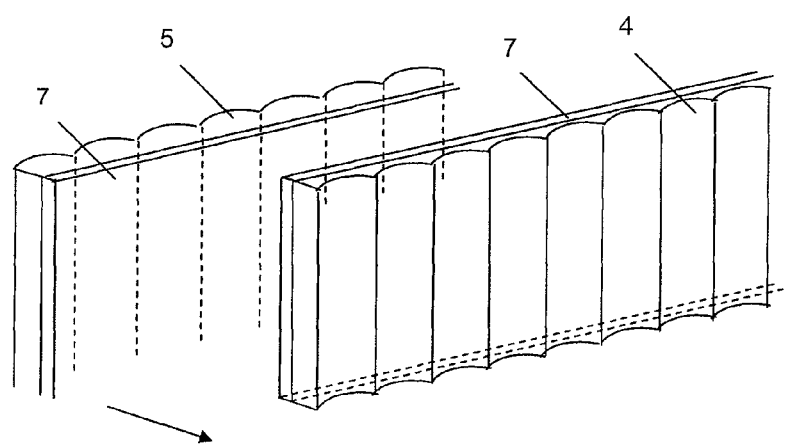
FIG. 4 shows a perspective view of two further embodiments of this invention, both being compound elements.

Other embodiments of the corrective array are shown in FIGS. 4a and 4b. A transparent carrier plate 7 is equipped with one of the corrective arrays 4 or/and 5, for example by polymer casting, and disposed as a separate compound element between the illumination matrix and imaging matrix. The arrow shows the direction of light incidence in the two figures. The compound element which comprises the components 7 and 4 is disposed with its carrier plate side very close to the illumination matrix in order to correct the field curvature. However, the compound element comprising the components 7 and 5 may be used as well for correcting. To this end it must be disposed with its carrier plate side very close to the imaging matrix. This compound element exhibits great strength of shape. Its good manageability allows efficient and reliable manufacture and assembly.

A major field of application of this invention are multi-view stereo displays often used for advertising purposes, containing as a hardcopy on film or any other data carrier multiple views taken from different angles which they project into space in a fan-shaped manner. The illumination may here be transmissive or reflective.

According to a further embodiment of this invention, it is generally possible to use GRIN lenses as correction elements for the individual lenticules 31. They are characterised in that they consist of a material where the lens effect is caused by continuous variation of the refractive index as a function of spatial coordinates in the medium, and where a refractive index profile can be set during the manufacturing process. This allows disturbing optical errors to be avoided from the very beginning. They can have the shape of convex or concave lenses and may come in the form of strip lenses.

The problem of field curvature can also be solved by a matrix of so-called liquid lenses with variable focal lengths as a corrective matrix. They consist of at least two components and change their focal length continuously if a voltage is applied. By adapting their parameters to the parameters of the lenticulars used, it is advantageously possible to avoid or at least to minimise field curvature and other aberrations, as described above for GRIN lenses.

According to this invention the field curvature is corrected by using a minimum of optical means, while maintaining a design as flat as possible, requiring little manufacturing expenditure.

Another advantage is that the corrective matrix can be made by the same or similar technological process, together with the imaging matrix. Using corrective matrices according to this invention in combination with lenticulars as imaging matrices for stereoscopic displays with directed backlight, or with multi-view displays, or generally with lenticulars with imaging function in large-area display devices, allows to achieve an improved imaging quality and—in case of autostereoscopic displays with directed backlight—a more homogeneous illumination of the information-carrying panel for 2D and 3D viewing at unvaried brightness.

Thanks to the field curvature correction according to this invention, the resolution capacity of the illumination matrix with multi-user displays and thus the number of controllable viewer positions is maintained because only a minimum number of illumination elements needs to be activated for each detected viewer position thus providing the viewer with the stereoscopic image information assigned to him or her by way of a sweet spot. The available illumination elements, with respect to pixels, can all be activated separately. Replaceability of the image matrix is not influenced by the corrective matrix in any way.

Another advantage of this invention is that with autostereoscopic multi-user displays any, even a relatively large number of pixels can be combined to be imaged through one lenticule. This makes it possible for the lenticules to be comparatively wide, so that manufacturing tolerances may be less critical, which in turn leads to a considerable reduction in manufacturing costs for a structured lenticular foil.

While the invention has been described with reference to the preferred embodiment, it will be appreciated by those of ordinary skill in the art that modifications can be made to the parts that comprise the invention without departing from the spirit and scope thereof.

The invention claimed is:

1. An image display device for an autostereoscopic display with a sweet spot unit containing an imaging matrix with optical imaging elements and a multitude of point elements, whereby the point elements are controllable illumination elements of an illumination matrix, are situated in a rear focal plane of the imaging matrix, and whereby light of activated controllable illumination elements is imaged onto a viewer's eyes in sweet spots by one imaging element via bundles of parallel rays through an image matrix, wherein a one-piece optical correction element is assigned to each imaging element for correcting field curvature of that imaging element and where the optical correction elements form a corrective matrix comprising a structure resulting from a shape of the correction elements predetermined by the field curvature of individual imaging elements as well as from a pitch of the correction elements.

2. The image display device according to claim 1, where always only one corrective matrix is disposed in an optical path of the imaging rays.

3. The image display device according to claim 2, where the corrective matrix has variable optical parameters.

4. The image display device according to claim 3 where a variable optical parameter is a focal length, and where the correction element is one liquid lens per lenticule.

5. The image display device according to claim 2, where the corrective matrix comprises a plane face, the plane face being connected with a surface of the illumination matrix.

6. The image display device according to claim 1, where the imaging matrix is a lenticular array and the imaging elements are convex lenticules arranged in parallel to the lenticular array, and the corrective matrix is a lenticular array of correction elements arranged in parallel with each other.

7. The image display device according to claim 1, where a refractive index of the correction elements is adapted to a refractive index of an ambient medium in order to avoid jumps of the refractive index.

8. The image display device according to claim 1, where the illumination elements are controllable illuminated openings of a shutter, which are summed up in any defined number to form a functional unit for one lenticule in each case.

9. The image display device according to claim 1, where the corrective matrix is formed by structuring a surface of the illumination matrix such that the structure has a shape for correcting the field curvature.

* * * * *